July 28, 1959
A. BÜTTNER
2,896,532
MACHINE FOR HEATING EMBOSSING MOULDS
OF HIGH-SPEED CYLINDER PRESSES
Filed March 16, 1954
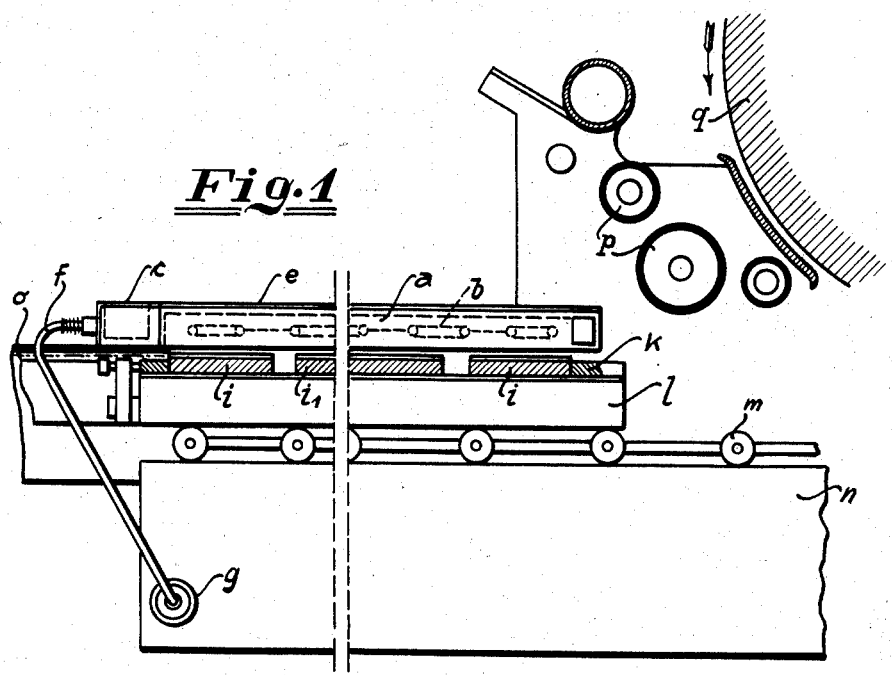
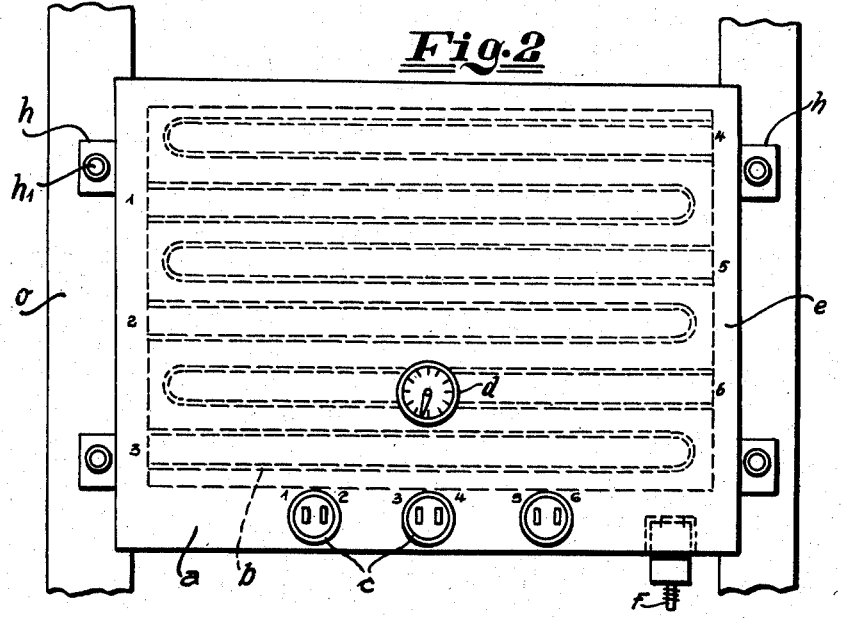
INVENTOR.
ARTUR BÜTTNER
BY

United States Patent Office 2,896,532
Patented July 28, 1959

2,896,532
MACHINE FOR HEATING EMBOSSING MOULDS OF HIGH-SPEED CYLINDER PRESSES

Artur Büttner, Heidelberg, Germany, assignor to Schnellpressenfabrik Aktiengesellschaft Heidelberg, Heidelberg, Germany Application March 16, 1954, Serial No. 416,617

Claims priority, application Germany March 19, 1953

1 Claim. (Cl. 101—25)

This invention relates to a process and means for heating embossing moulds for embossing by the hot process on high-speed cylinder presses.

In connection with embossing operations, or relief printing operations, and for preventing the breaking of the paper to be embossed, or for obtaining a particular deep embossed effect and for increasing the gloss with relief printing, it is known to work with embossing moulds heated by suitable means to a relatively high temperature which is usually in the region of 70 to 80° C. This heating of the embossing moulds and their supports is effected either by directly heating the embossing moulds themselves or their supports, or by heating the bed carrying the embossing mould. For this purpose, there are used electrical heating means with resistance heating wires embedded in an insulated manner in the bed plate or the embossing moulds. When using high-speed cylinder presses for embossing or relief operations, this direct electrical heating of the embossing moulds—in the same way as any heating of the printing bed by built-in electrical heating elements—renders it necessary for the connection of the heating means to be effected through a cable corresponding to the length of type bed track on account of the reciprocating movement of the type bed, said cable being pulled backwards and forwards with the type bed over the full path of the latter. Apart from the constant mechanical stressing of the cable, which impairs very considerably the effective life of the cable and which is the cause of frequent interruptions in operation, the work on the high-speed press is impeded thereby to quite a considerable extent. In addition, this method of heating is of considerable expense, since the embossing moulds, which are constantly changing with the work, always have to be provided afresh with heating means.

In order to obviate these disadvantages of the known processes and means for heating embossing moulds, it is now proposed in accordance with the process of the invention, to effect the heating of the embossing moulds and their supports by heat radiation from electrical heating means which are arranged in spaced relation to said moulds. The initial heating of the embossing moulds before commencement of the embossing operation is carried out with the type bed in a rest position, preferably the reversing station of the type bed in front of the inking mechanism, heating being effected by stationary heating means arranged above the path of movement of the embossing moulds at a small spacing from the latter and conveniently supported on the machine frame. After completion of the initial heating operation, which is carried out until the required working temperature of the embossing moulds is reached, further heating is effected by heat absorption from the stationary heating means during the travel of the embossing moulds below the heating means throughout the duration of the reversing movement of the type bed. Resistance heating elements, infra-red radiators or the like may be used as heating means. The initial heating of the embossing moulds in their rest position before starting work, is preferably effected with full heating capacity or at least a higher heating capacity than the continued heating during the working operation, which has to serve only for maintaining the temperature of the embossing moulds. The heating capacity necessary for this maintenance of temperature depends to a large extent on the working speed of the machine. The heating means is mounted on the machine frame to bridge over the track of the type bed and is either rigidly connected to the machine frame or detachably secured thereto. The heating means consists advantageously of a frame which bridges over the track of the type bed and which carries the heating elements proper, together with electrical connections and, if desired, switching means, the said heating means being provided with heat insulation means which covers the heating elements at the top. With a detachable construction of this heating device, the frame is expediently provided along its longitudinal sides, or supporting sides, with adjusting screws, through which the support on the machine frame or the rack guards is effected and by which the spacing of the heating means from the embossing mould may be adjusted. In order to protect the bed carrying the embossing mould and those parts of the machine located therebeneath against the heat action of the heating elements, the said bed may be covered by a layer of heat-insulating material. By means of step switches, which are preferably arranged on the heating means, the heating elements may be switched on and off separately or in groups, the switching stages preferably being provided with data concerning the corresponding printing speeds for the further heating during the embossing operation. The heating means may be equipped with an indicating thermometer for controlling the effective temperature.

The heating means is thus arranged to be stationary, so that the current supply system does not have to follow the movement of the type bed, but may be effected in a very simple manner by means of fixed connections. In this way, operational difficulties resulting from the otherwise usual movement of the cable can be obviated. The embossing moulds, which are used in a customary manner for cold embossing, may now also be employed without complication for hot embossing, thereby avoiding the necessity and expense of installing special heating means in the embossing mould as required from case to case. The novel heating arrangement renders possible the heating of any type of embossing mould when required and, when the heating arrangement is of detachable construction, it does not require any structural modifications of the high-speed press.

For a better understanding of the invention, the same will now be described with reference to one embodiment which is shown, by way of example, in the accompanying drawing, in which:

Figure 1 is a fragmentary side elevation of a high-speed cylinder press having a type bed shown in a position of reversal in front of the inking mechanism, there being a heating arrangement disposed above the type bed, and Figure 2 is a plan view of the heating arrangement.

The high-speed press comprises a base frame $n$ which carries in known manner an impression cylinder $q$ and inking mechanism $p$, which is shown diagrammatically. Upon a roller carriage $m$ movably mounted in the base frame $n$, there travels in known manner, a bed $l$, carrying embossing moulds $i$ which are locked in a chase $k$ together with their supports. Arranged between the bed $l$ and the chase $k$ with the embossing moulds $i$, is an insulating layer $i_1$ which covers the bed and the parts of the machine located therebeneath. Arranged above the embossing moulds $i$ at a distance from the top surfaces thereof, is a frame or casing $a$, which is supported on a rack cover $o$ by adjusting screws $h_1$ engaged by threaded lugs h, secured to the frame or casing a, and by which the spacing of the heating means from the embossing moulds i may be varied as required. On its upper surface, the frame carries a cover plate e made of heat-insulating material, such as moulded insulating material, mica or the like. Arranged in the frame a are heating bars or elements b, which are connected through a connecting cable and a plug connection f and step switch c to a plug socket g. The plugs socket g in the present constructional embodiment, is arranged on the machine frame; however, it will be obvious that for connection purposes there may also be used a socket which is located at any suitable position outside the machine. In the present embodiment there are provided six heating elements b which can be switched on and off as required by the step switches c. The temperature developed by the heating means may be measured with the aid of a thermometer d.

Before commencing the embossing operation, the embossing moulds i are initially heated by positioning the heating means a on the rack guard o in such manner that the heating means bridges or extends over the bed l and the embossing moulds i, while said bed is in its stationary end position. By means of the adjusting screws $h_1$, the spacing of the heating means from the embossing moulds i is adjusted and the heating arrangement is connected by means of the cable f to a plug socket. For initially heating the embossing moulds which are disposed beneath the heating means in the rest position of the bed l, all available heating elements can be switched on by the step switches c in order to obtain a shortest possible heating-up period by utilising the full heating capacity. When the embossing moulds have reached the temperature necessary for embossing by the hot process, the machine is set in operation, the bed l together with the embossing moulds i being moved across the frame and beneath the impression cylinder q in known manner, in timed reciprocating motion dependent upon the printing speed, so that the bed travels to and from a position underneath the heating means. The entry and discharge time of the embossing moulds into and out of position beneath the heating means, and thus the heat-absorption time available for making up the heat losses, will depend upon the prevailing printing speed. The higher the printing speed, the less will be the time available for the absorption of heat, so that with a slow printing speed, a lower heating output will be sufficient to maintain a given temperature of the embossing moulds during the embossing operation, whereas a higher heating output will be necessary for a higher printing speed. After starting the embossing operation, the heating output is therefore reduced to a greater or lesser extent by means of the step switches according to the actual printing speed. At slow printing speeds, the switching on of one or two of the heating elements will be sufficient to maintain the required temperature, whereas at higher printing speed, further heating elements will have to be switched into circuit in order to avoid a drop in temperature. The step switches, or the separate stages thereof, are preferably provided from the outset with data regarding the printing speed corresponding to each actual switch position. The temperature may also be regulated by thermostat control means such as are known per se.

Having thus described the invention, what is claimed as new and desired to be secured by Letters Patent, is:

In a high-speed cylinder printing press having a machine frame; track means on said frame, a bed disposed for reciprocation on said track means between two end positions, at least one embossing mould carried by said bed, rack guard means supported by said frame, a casing, adjusting means vertically adjustably securing said casing to said rack guard means, heating means supported within said casing in a common plane and spaced from said bed and said embossing mould upon arrival of said bed at one of said end positions during reciprocation thereof so that heat may be radiated to said embossing mould by said heating means, said heating means including a plurality of heating elements, control means for actuating as many of said elements as required depending on the speed of operation of said reciprocating bed, an insulated cover supported by said casing above said heating means for reducing radiation of heat in a direction away from said bed, and an insulating layer means provided on said bed and below said embossing mould for insulating said frame from said heating means, the distance between said heating means and said mould being varied through said adjusting means to further control the amount of heat radiated to said mould.

References Cited in the file of this patent

UNITED STATES PATENTS

| | | |
|---|---|---|
| 410,521 | Jaeger | Sept. 3, 1889 |
| 474,964 | Mitchell | May 17, 1892 |
| 1,036,612 | Hadaway | Aug. 27, 1912 |
| 1,269,642 | Preble | June 18, 1918 |
| 1,554,235 | Scagers | Sept. 22, 1925 |
| 1,656,824 | Marans | Jan. 17, 1928 |
| 1,740,285 | Correll | Dec. 17, 1929 |
| 2,070,293 | Morgan | Feb. 9, 1937 |
| 2,489,229 | Steckley | Nov. 22, 1949 |
| 2,592,379 | Barney | Apr. 8, 1952 |
| 2,651,702 | Burke et al. | Sept. 8, 1953 |

FOREIGN PATENTS

| | | |
|---|---|---|
| 14,504 | Norway | Mar. 18, 1904 |